Nov. 22, 1955 — S. F. CAIN — 2,724,209
ANIMAL TRAP
Filed June 24, 1950
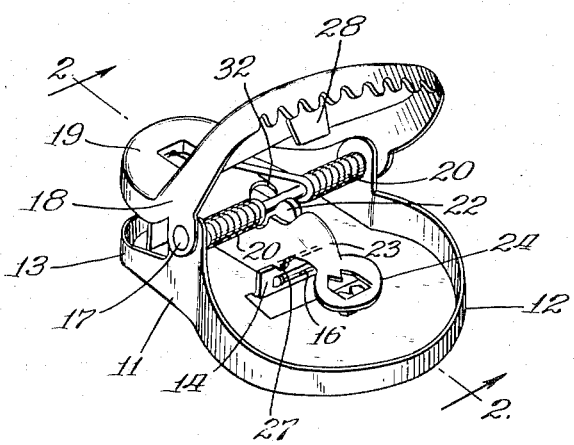
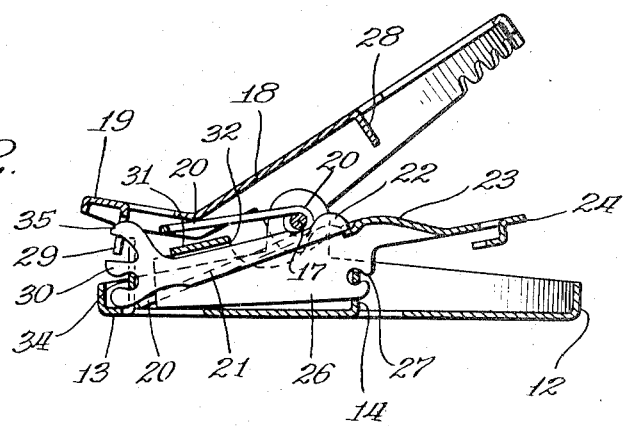
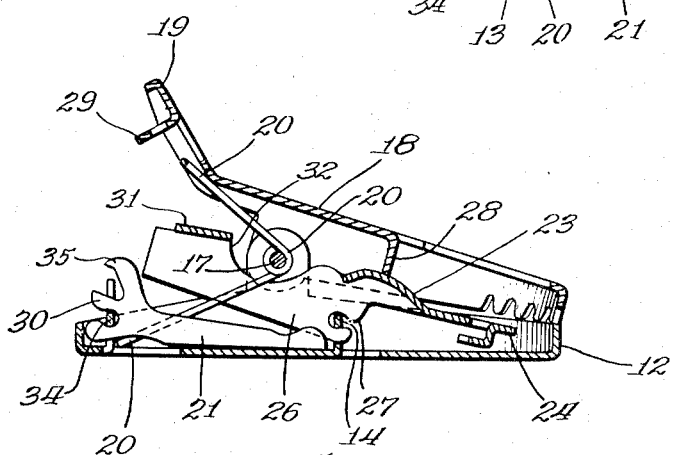
INVENTOR.
Stanley F. Cain United States Patent Office 2,724,209
Patented Nov. 22, 1955

2,724,209

ANIMAL TRAP

Stanley F. Cain, Marengo, Ill., assignor to McGill Metal Products Company, Marengo, Ill., a corporation of Illinois Application June 24, 1950, Serial No. 172,856

2 Claims. (Cl. 43—83.5)

The present invention relates to animal traps.

More particularly, the invention relates to automatically setting traps of the type used in catching mice.

At present, there is a continuing demand for traps of the above type, and in particular, traps of the type wherein a pair of rearwardly extending lever members or finger plates are to be pinched together at the rear in a manner so that the trap is set without handling the trap jaw itself, and consequently, without danger of having the fingers caught in the jaw members. This last is a feature appealing to householders, and particularly to women. However, in prior traps, the cost of manufacture has been relatively high and the construction has been such that trouble has been experienced in the damaging of the automatic setting means. One of the chief causes of this damage, has been due to accidental presetting of the latching member comprising a part of the setting means, prior to the operation normally required to set the trap. Subsequent operation of the setting means thereafter, sometimes deforms the latching shoulder, or the like, of the latching member so that the trap cannot be set properly.

It is therefore an object of my invention to provide an improved automatic setting trap of the type generally used to catch mice which can be easily and cheaply manufactured in large quantities, and in a construction which is subject to handling in every way prior to use without damage to the trap setting mechanism.

A further object of the invention is to provide an improved automatic setting trap which cannot be preset in handling and shipping of the trap so as to injure the mechanism for later actual setting.

A feature of the invention is the provision of a trap having a moving jaw member or striker, the jaw member having a protrusion extending therefrom which engages a portion of the setting means of the trap, and prevents presetting of the same when the trap is in the released position.

Other objects, features and many of the attendant advantages of this invention will be appreciated readily as the same becomes understood by reference to the following detailed description, when considered in connection with the accompanying drawings, wherein:

Fig. 1 is a perspective view of the automatic setting trap comprising the invention;

Fig. 2 is a sectional view taken through plane 2—2 of Fig. 1, and showing the trap in the set position;

Fig. 3 is a sectional view of the trap shown in Fig. 1, showing the trap in the released position; and In practicing the invention, a trap including two pivotally joined jaw members normally biased to a closed position in a jaw-like fashion by a strong biasing spring, is provided. One of the jaw members has a centrally disposed pivotal support comprising an integral, punched out portion forming a crossbar disposed slightly above its surface. Formed on the other of the jaw members, is a lip or protrusion extending toward the first mentioned jaw member, and engaging the trigger of the trap setting means when the trap is in the released position. The trigger has a notch in its underportion by means of which it is pivotally supported on the crossbar, and is prevented from assuming its set condition by the lip, after the trap has been released.

Referring now to Fig. 1, an automatically set trap is shown, which includes a lower jaw member 11 comprising a substantially flat piece of sheet metal, or the like, having a forward, arcuate jaw portion 12, and a finger plate 13, or setting lever portion. Centrally disposed on lower jaw member 11 is a pivotal support 14 comprising an integral, punched out portion bent upwardly to form substantially a right angle with the flat surface of jaw member 11, and having the central portion 16 thereof, cut out to form a crossbar. Pivotally mounted on a crosspin 17 supported in a pair of upright supports integral with lower jaw member 11, is an upper jaw member 18 having a forward arcuate jaw portion, and a finger plate 19, or setting lever portion. Upper jaw member 11 is normally biased to the closed position shown in Fig. 3, by a strong coil spring 20 supported on crosspin 17. To retain the jaw members in the set position shown in Fig. 2, a setting means is provided, including a latching member 21 for releasably engaging the upper jaw member 18. Latching member 21 has an elongated extension arm 22 detachably seated on a trigger 23 comprising a centrally pivoted lever having a forwardly extending bait treadle arm 24, and a rearwardly extending U-shaped arm 26. Formed in the underportion of trigger 23, is an elongated notch 27, or open slot terminating in an enlarged aperture, by means of which, trigger 23 is pivotally secured to pivotal support 14. By reason of this construction, the pivotal mounting for trigger 23, can be easily provided in a simple two step punching process, and the final assembly of the trigger on jaw member 11, can be quickly accomplished in a simple slide on operation; thereby reducing to a minimum the time and number of steps required in the production of a trap of this type. Further, due to the particular configuration of notch 27, trigger 23 has greater freedom for pivotal movement, resulting in an improved action.

In order to prevent damage to the setting means of the trap, upper jaw member 18 is provided with a lip 28, or integral protrusion extending downwardly towards lower jaw member 11, which is centrally disposed, as is best shown in Fig. 3, so as to engage trigger 23 when the trap is in the released position. This feature prevents extension arm 22 of latching member 21 from seating on trigger 23 when the trap is in the released position, for, should this phenomenon occur, and the finger plates 13 and 19 be subsequently pinched together to set the trap, the portion of latching member 21 that releasably engages upper jaw member 18, as well as the alignment of latching member 21, would be subject to deformation. Thus, it can be readily appreciated that the invention prevents the damaging, and subsequent loss, of a large number of traps, for the above mentioned phenomenon occurs quite often.

In order to set the trap, the finger plates 13 and 19 are pinched firmly together forcing the arcuate jaw portions apart against the action of coil spring 20. Upon finger plate 19 nearing the end of its travel, a downwardly extending crosspiece 29 engages a lower setting shoulder 30 formed on latching member 21, pivoting the extension arm 22 upwardly. Simultaneously with this movement, the upper edge of latching member 21 engages the underportion of a cowling 31 formed on the end of U-shaped lever portion 26 of trigger 23, flipping that end of trigger lever 23 upwardly about its pivotal axis. This action provides sufficient room for the end of extension arm 22 to move upwardly through an elongated aperture 32 formed in the vertex portion of said U-shaped lever portion, and lift above a seat formed in trigger 23 at the forward end of aperture 32. Upon releasing the pressure on the finger plates, crosspiece 29 is lifted off shoulder 30, thereby allowing latching member 21 to pivot downwardly about its pivotal axis 34. Simultaneously with this action, the U-shaped portion of trigger 23 is pivoted downwardly, due to overbalancing, disposing trigger 23 in the setting position, and seating the end of extension arm 22 in the seat formed in the top of said trigger. Subsequent upward movement of the crosspiece 29, causes that element to engage the underedge of a detent shoulder 35 formed on latching member 21, tending to pivot the same forwardly about axis 34. Due to the fact that the end of extension arm 22 is seated on the top of trigger 23 pivotal movement of detent shoulder 35 is prevented, and upper jaw member 18 is retained in the set position. Should a rat or a mouse thereafter force the bait treadle portion 24 downwardly, trigger 23 is pivoted sufficiently to allow the end of extension arm 22 to slip past the top thereof; thereby releasing crosspiece 29 from detent shoulder 35, and allowing the upper jaw member to be pivoted downwardly in a clamping fashion.

Due to the configuration of the trigger mounting means, the final assembly of the trap is greatly simplified, and quick and easy movement of the trigger is provided. Jamming of trap setting means is assured against by reason of the downwardly extending lip 28 on upper jaw member 18, thereby resulting in the saving of a substantial number of traps.

Obviously, other modifications and variations of the invention are possible in the light of the above teachings. It is therefore to be understood that changes can be made therein which are within the full intended scope of the invention as defined by the appended claims.

I claim:

1. An animal trap including in combination, a lower jaw member having a forward end and a rear end, an upper jaw member having a forward end and a rear end pivoted to said lower jaw member on a transverse axis intermediate the ends of said members, spring means for biasing said jaw members about said transverse axis in opposing angular directions when the trap is released to close the forward ends of said members, a latching member pivoted to said lower jaw member on a transverse axis adjacent the rear end thereof, said latching member having a rearwardly extending shoulder portion and a forwardly extending elongated arm portion, a trigger member having a forwardly extending treadle arm portion and a rearwardly extending portion and being pivoted to said lower jaw member on a transverse axis forward of the pivot axis of said latching member, with said trigger member being so pivoted that the rearwardly extending portion thereof normally drops downwardly under the influence of gravity towards said lower jaw member, a downwardly extending member depending from said rear end of said upper jaw member having a portion for engaging said shoulder portion of said latching member when said jaw members are manually pivoted about their transverse pivot axis approximately to close the rear ends thereof, with said downwardly extending member thereby pivoting said elongated arm portion of said latching member upward and over said rearwardly extending portion of said trigger member and with said downwardly extending member latching with said shoulder portion of said latching member to establish the trap in a set condition, and a downwardly extending lip member depending from said upper jaw member at a point forward of the pivot axis of said trigger member and disposed over said forwardly extending treadle arm portion of said trigger member, said lip member limiting the pivotal movement of said trigger member when the trap is in a released position to prevent said trigger member from assuming a position in which said elongated arm portion of said latching member can inadvertently latch therewith before the trap is set.

2. An animal trap including in combination, a lower substantially flat jaw member having a forward jaw portion and a rearward manual setting portion, an upper jaw member pivoted to said lower jaw member on a transverse axis intermediate the ends of said members, said upper jaw member having a forward jaw portion and an upwardly flared rearward manual setting portion, spring means for biasing said jaw members about said transverse axis in opposing angular directions when the trap is released to close said forward jaw portions, a latching member pivoted to said lower jaw member on a transverse axis adjacent the rear thereof, said latching member having a rearwardly extending shoulder portion and a forwardly extending elongated arm portion, a trigger member pivoted to said lower jaw member on a transverse axis forward of the pivot axis of said latching member, said trigger member having a forwardly extending treadle arm portion and having a rearwardly extending U-shaped arm portion with an elongated aperture formed in the vertex portion thereof to the rear of the pivot axis of said trigger member, said trigger member being provided with a seat forward of said elongated aperture and said trigger member being so pivoted that said U-shaped arm portion thereof normally drops downwardly towards said lower jaw member under the influence of gravity and said seat being positioned to receive the forward part of said elongated arm portion of said latching member, a downwardly extending cross-piece depending from the rear of said upper jaw member having a portion for engaging said shoulder portion of said latching member when said manual setting portions of said jaw members are brought together so as to pivot said elongated arm portion of said latching member upward and through said aperture in said U-shaped arm portion, whereby the end of said arm portion engages said seat of said trigger member and said portion of the cross-piece latches with said shoulder portion of said latching member to establish the trap in a set condition, and a downwardly extending lip member depending from said upper jaw member at a point forward of the pivot axis of said trigger member and disposed over said forwardly extending treadle arm portion of said trigger member, said lip member limiting the pivotal movement of said trigger member when the trap is in a released position to prevent said trigger member from assuming a position in which said elongated arm portion of said latching member can inadvertently latch therewith before the trap is set.

References Cited in the file of this patent

UNITED STATES PATENTS

| | | |
|---|---|---|
| 1,362,168 | McQuaid | Dec. 14, 1920 |
| 2,068,508 | Orr | Jan. 19, 1937 |
| 2,100,925 | Stilson | Nov. 30, 1937 |
| 2,201,918 | Petersen | May 21, 1940 |
| 2,489,895 | Kash | Nov. 29, 1949 |